: 2,980,204
Patented Apr. 18, 1961

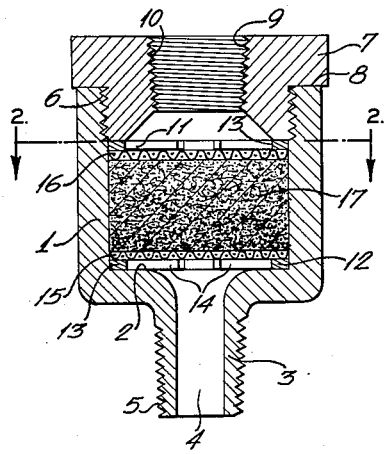
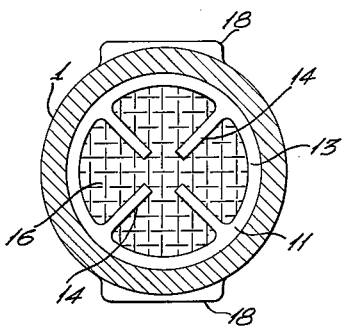
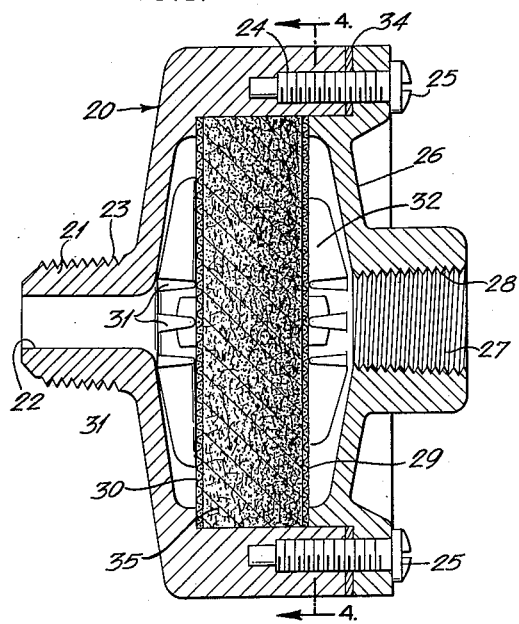
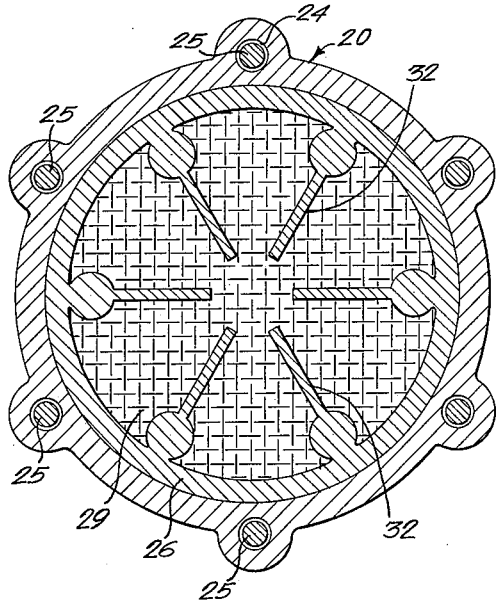
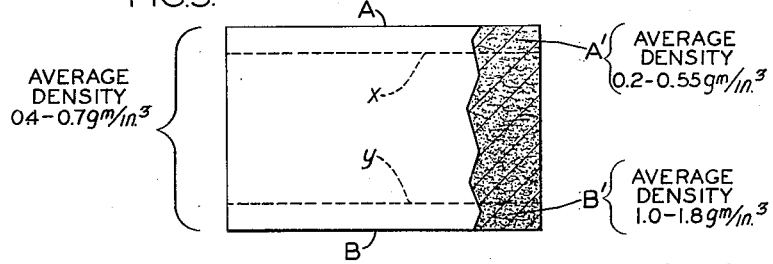

2,980,204
APPARATUS FOR FILTERING GAS

Claude W. Jordan, Paoli, Pa., assignor to The United Gas Improvement Company, Philadelphia, Pa., a corporation of Pennsylvania Filed Aug. 4, 1959, Ser. No. 831,581

10 Claims. (Cl. 183—45)

The present invention relates to apparatus for filtering gas. More particularly, this invention pertains to gas filtering apparatus adapted to remove extremely minute vapor phase gum particles and inorganic particles suspended in combustible gas flowing to a low rate appliance burner. This application is a continuation-in-part of my application Serial No. 690,964 filed October 18, 1957, now abandoned.

In manufactured combustible gas, such as coal gas, coke oven gas, oil gas, carburetted water gas, reformed natural gas, and the like, there are present extremely small particles of both organic and inorganic substances which remain in suspension in the gas throughout the entire gas distribution system.

The organic substances are commonly referred to as "vapor phase gum particles," and are formed by reaction between very small concentrations of oxides of nitrogen and certain unsaturated hydrocarbons found in manufactured combustible gas. The formation of these vapor phase gum particles proceeds throughout the gas distribution system, as for example in gas mains, as long as there are nitric oxides present in the gas. These vapor phase gum particles have diametrical dimensions on the order of about one micron and below, and in typical combustible gases, the number of such particles present may be on the order of 20,000 to 100,000 per cubic centimeter of gas, equivalent to approximately 566,000,000 and 2,800,000,000 particles per cubic foot, respectively. Many of such gum particles are so small that they cannot be observed even with an ultra-microscope.

Extremely small particles of inorganic substances, mainly oxides of iron and silica, are present in both manufactured and natural gas, and may originate from corrosion of the internal surfaces of distribution mains and house piping, or may be adventitious substances present in gas mains and house piping at the time of their installation. Their particle size distribution varies greatly, depending upon their origin; however, a large percentage thereof may be of extremely minute particle size so that they become suspended in combustible gas, particularly at times of high gas velocity, and remain in suspension even though the gas is passed through commercial gas cleaners, such as pipe line scrubbers, and the like. For example, in the distribution of natural gas, the number of inorganic particles having diametrical dimensions on the order of about 1 micron and less is known to be of the same order of magnitude as vapor phase gum particles in manufactured gas.

These extremely minute particles, particularly the vapor phase gum particles, block the small orifices of control valves of low rate appliance burners, such as the needle valves of gas ranges and water heater pilots, and those controlling the flow of gas to gas refrigerator burners. The consequent stoppage of glas flow through such valves causes extinction of the burners associated with them, a source of nuisance and expense, and in a case of automatic appliances, a possible source to danger.

To avoid pilot trouble it is necessary to remove these particles as completely as possible, since, for example, only an extremely small quantity of gum is required to block the needle valves of commonly used pilot burners, such as a lighter known commercially as the "Rutz" lighter, which in heavily gummed gas may be extinguished in four hours by as little as 0.00025 gram of gum. Thus, the gas entering the pilot burner for combustion should show no visible particles in the Tyndall beam, and microscopic examination of valve needles should reveal no gum deposits.

Because gum particles are continually formed throughout the gas distribution system, and particles of an inorganic nature originate throughout the system from corrosion of the internal surfaces of distribution mains, house piping, and the like, the gas must be filtered at the appliance. This means that the filter must be small to permit application to existing appliances. Also, due to the low pressure of the gas at the appliance, generally on the order of from 3 to 8 inches of water column, the drop in pressure across the filter must be very low. A pressure drop across such a filter of approximately one inch of water column is all that is permitted in most distribution systems.

The filters must be of simple, economical construction and must have a reasonably long useful life without diminution of gas flow due to accumulated solids, for otherwise, failure of the filter would merely be substituted for failure of the valve. Furthermore, if frequent servicing is required, such servicing would consume the savings due to the use of such a filter.

A detailed account of the vapor phase gum problem may be found in Industrial and Engineering Chemistry, vol. 26, p. 947 (1934); vol. 26, p. 1028 (1934), and vol. 27, p. 1180 (1935). Also, a detailed description of the physical and chemical properties of inorganic particles encountered in the distribution of natural gas may be found in Bulletin 63, Mineral Industries Experiment Station, The Pennsylvania State University, University Park, Pennsylvania.

Extensive efforts, involving many different approaches, have been made to solve the problem of removing these extremely small vapor phase gum particles and inorganic particles from combustible gas before they can enter and clog pilot valves. The more successful and practical solutions of this problem involve filtration of the particles from the combustible gas by passing the gas through a filter element comprising fine fibers of rock wool, glass, and the like, having diameters on the order of a few microns. Such fine fibers, however, tend to lack resilience and to adhere to one another in strands, and thus form channels in the filter mass, or compact and build up an excessively high resistance to gas flow. For this reason it has been suggested to support these extremely fine fibers with stronger, more elastic fibers of larger diameter, and relatively successful gas filters have been fabricated with such combination of fiber sizes. Although such filters effectively remove vapor phase gum particles and inorganic particles suspended in a combustible gas, rates of gas flow substantially in excess of about 5 cubic feet per hour per square inch cross-sectional area for a one inch water column pressure drop have not been obtainable therewith. The desirability of an effective gas filter which has a relatively long life and which permits substantially increased rates of gas flow for the permissible one inch water column pressure drop is obvious.

A principal object of the present invention is to provide an efficient and economical method of and apparatus for filtering extremely minute inorganic and organic particles from a gas.

Another object of this invention is the provision of a novel gas filter adapted to substantially completely remove extremely minute vapor phase gum particles and inorganic particles suspended in a combustible gas, which filter device permits greatly increased rates of gas flow per unit cross-sectional area of the filter for a given drop in pressure across such device.

A further object of this invention is the provision of an improved gas filter of simple, economical construction which has a relatively long life and substantially increased filtering capacity.

A still further object of this invention is the provision of an improved apparatus for filtering gas which meets all of the standards of the American Standard Listing Requirements for Gum Protective Devices, effective January 1, 1946, approved, American Standards Association, sponsor, the American Gas Association, and provides gas flow rates substantially greater than heretofore attainable with existing filter devices.

These and other objects of this invention will become more clearly apparent from the consideration of this specification and claims, and accompanying drawings in which:

Fig. 1 illustrates a vertical cross-section of a filter for domestic gas range pilots.

Fig. 2 illustrates a horizontal cross-section along the line 2—2 in Fig. 1.

Fig. 3 shows a vertical cross-section of a filter for gas refrigerator burners.

Fig. 4 shows a horizontal cross-section along the line 4—4 in Fig. 3.

Fig. 5 is a schematic view in cross-section showing density gradient of a filter element according to this invention.

According to this invention there is provided a gas filter adapted to remove from a gas extremely minute vapor phase gum particles and inorganic particles, comprising a filter casing having inlet and outlet openings, and a filter element in the form of a resilient mat comprising extremely fine glass fibers bonded together by a bonding agent arranged in the casing for the flow of gas therethrough. The glass fibers have a diameter not exceeding about 3 microns. The filter element has an average density of from about 0.4 to about 0.7 gram per cubic inch, and increases in density in the direction of gas flow, the average density of that portion of the filter element extending in the direction of gas flow from the inlet surface one-eighth of the distance to the outlet surface being from about 0.2 to about 0.55 gram per cubic inch, and that portion extending one-eighth of the distance from the outlet surface toward the inlet surface having an average density of from about 1 to about 1.8 grams per cubic inch.

It was found that greatly increased rates of gas flow can be obtained with complete filtration of suspended particles when extremely fine glass fibers having an enormous surface area relative to their weight are bonded together by means of a suitable bonding agent in such a manner as to rovide filter elements, in the form of resilient mats, which increase in density in the direction of flow of gas therethrough. In addition, the capacity of the gas filter of this invention for particulate matter is substantially greater than known filters at corresponding pressure drop. Thus, the useful life of the novel filter is substantially greater than filters heretofore used for removing particulate matter from gas streams.

The bonding agent not only bonds the component glass fibers together, thereby preventing their relative displacement, which would result in the formation of channels in the filter mass, but also provides the resulting mats with a great resilience or elasticity, by reason of which the mats completely fill the space into which they are compressed.

These resilient mats are replete with minute voids throughout their entire thickness, and if provided with the required average density and density gradation, factors more fully considered hereinafter, permit gum particles and inorganic particles to penetrate the mats and be absorbed upon the fibers.

The filter element employed in the gas filter of this invention has a continuously graduated porosity (density), with high porosity (low density) in the inlet portion thereof, and low porosity (high density) at the outlet portion thereof, whereby a graduated rate of particle removal from the gas stream is obtained. Filter efficiency thus increases in direct proportion to decrease in particle concentration in the gas stream. Expressed another way, the rate of particle deposition is a function of the particle concentration, and is highest in the low density inlet portion of the filter and least in the high density outlet portion of the filter. Thus, the inlet portion of the filter, because of its greater voids, is adapted to remove from the gas stream and retain substantial quantities of particulate matter without plugging, and the outlet portion of greater density is adapted to effect quantitative removal of particulate matter at low concentration and at relatively high gas velocities, without plugging.

This type of filter action is particularly advantageous in providing highly effective filters of long useful life without undue increase in filter resistance or pressure drop, for the filter element has an increased capacity for particulate matter, without sacrifice of filter life.

The glass fibers employed in the novel gas filter apparatus of this invention are of extreme fineness and have an enormous surface area relative to their weight. The diameter of the glass fibers should not exceed about 3 microns, and generally the glass fibers will have a diameter from about 0.5 to about 3 microns. Suitable glass fibers preferably have a length within the range between about 0.1 and about 1.0 in.

Fibers of this extreme fineness may be made by the method described in U.S. Patent No. 2,489,242.

In making the filter elements employed in this invention, glass fibers are collected, generally as extruded, in layers on a perforated moving conveyor through which air is drawn, with a bonding agent being sprayed on the fibers concurrently. The bonding agent may be in solution or suspension in water or other liquid vehicle. A small amount of lubricating substance, such as petroleum oil, may be added to the binder solution or suspension if desired. In this way, the bonding agent is evenly distributed throughout the fibers, and the resulting mat is of highly permanent dimensions and is extremely resilient, so that regardless of how it is deformed it immediately springs back into shape.

The glass fibers are collected on the conveyor in what may be considered successive, superimposed layers until a mat of the desired thickness, e.g. one inch in thickness, is obtained. The layers of fibers closest to the conveyor have a higher density than the subsequently superimposed layers as a result of applied suction and the compressive force exerted by the weight of each succeeding layer of fibers.

The fiber orientation is essentially random within the several filter layers which lie approximately parallel to the mat surfaces, there being some orientation of the fibers in the direction of conveyor travel.

The amount of bonding agent required to provide such resilient mats of fine glass fibers is generally on the order of from about 25 to about 35%, by weight, based on glass fibers. This amount of bonding agent provides a mat of the desired resiliency, average density and density gradation.

Bonding agents which may be employed to bond the fine fibers of glass together into resilient mats are generally synthetic resins of either the thermosetting and thermoplastic types. Typical of the thermosetting resins which may be employed are the phenol and urea formaldehyde resins, silicone resins, and the like. Suitable thermoplastic resins are the vinyl resins, such as polyvinyl chloride, polyvinyl acetate, etc. If the novel filter apparatus of this invention may be exposed to relatively high temperatures, thermosetting resins preferably are used.

The resulting resilient mat is thereafter heated to cure or set the binder, and cut into filter elements of the desired size. These cuttings are made so that the filter elements have a low density (high porosity) gas inlet surface and a high density (low porosity) gas outlet surface.

The term "density" is used in this specification and claims to mean apparent density as distinguished from absolute density, the apparent density being equal to the weight in grams of a given fibrous mass divided by the volume in cubic inches of the space occupied by it. Since the density of the filter element varies from the gas inlet side to the gas outlet side, average values of density are given for the filter and the several portions to indicate this density gradation.

In order to obtain the advantages of this invention it was found that the filter element should have an average density of from about 0.4 to about 0.7, the preferred average density being about 0.45. Of course, this density is not uniform throughout the filter element, the density being greater at the gas outlet portion of the filter element than at the inlet portion. This density gradation can best be seen with reference to Fig. 5, where there is illustrated in cross section a filter element according to this invention comprising glass fibers of a diameter of 3 microns or less, bonded with about 30% phenol formaldehyde resin. The filter element of Fig. 5 is installed in a filter casing, such as those illustrated in Figs. 1-4, so that gas, from which vapor phase gum particles and inorganic particles are to be removed, enters through inlet surface A, passes entirely through the filter element and out outlet surface B. That portion of the filter element indicated by A' has an average density of from about 0.2 to about 0.55. Portion A' extends roughly one-eighth of the distance from the gas inlet surface A toward gas outlet surface B. The density at inlet surface A is less than the density in the plane indicated by the dotted line $x$. The density of the filter element continues to increase with distance toward outlet surface B, the density in the plane indicated by the line $y$ being greater than that at line $x$. That one-eighth portion of the filter element indicated by B', has an average density of from about 1 to about 1.8, the density increasing from the line $y$ to outlet surface B.

Filter elements such as that illustrated in Fig. 5 and described above may be obtained by compressing a mat of glass fibers approximately 1" thick in a suitable housing to a thickness from about 3/8" to about 1/2". Since it is generally desirable to provide the filter element with a diameter somewhat greater than the diameter of the housing to prevent gas flow around the filter element, in providing the compressed filter element of the desired average density and density gradient, allowance must be made for this excess filter material. The 1" thick mat ordinarily will comprise 25 to 35% bonding agent, such as phenol formaldehyde resin, which after curing fixes the relative position of the fine glass fibers (3 microns or less in diameter) so that the mat is resilient and form-maintaining. This 1" thick mat, prior to compression varies in density from one surface to the other. This density gradation is set forth in Table I below, the data being based on 7/8" diameter cuttings.

Table 1

| Position of Cutting | Weight in Grams | Grams Per Cu. In. | Weight Percent Resin |
|---|---|---|---|
| Cutting "A" (belt side):[1] | | | |
| 1st 1/4" | 0.0420 | 0.2794 | 25.9 |
| 2d 1/4" | 0.0250 | 0.1663 | 30.8 |
| 3d 1/4" | 0.0190 | 0.1264 | 33.7 |
| 4th 1/4" | 0.0162 | 0.1078 | 22.8 |
| Avg | 0.0255 | 0.1699 | 28.3 |
| Cutting "B" (belt side):[1] | | | |
| 1st 1/4" | 0.0491 | 0.3266 | 16.1 |
| 2d 1/4" | 0.0420 | 0.2794 | 31.7 |
| 3d 1/4" | 0.0205 | 0.1364 | 42.4 |
| 4th 1/4" | 0.0124 | 0.0825 | 25.8 |
| Avg | 0.0310 | 0.2062 | 29.0 |
| Cutting "C" (belt side):[1] | | | |
| 1st 1/4" | 0.0412 | 0.2741 | 33.2 |
| 2d 1/4" | 0.0254 | 0.1690 | 30.3 |
| 3d 1/4" | 0.0132 | 0.0878 | 31.8 |
| 4th 1/4" | 0.0118 | 0.0785 | 27.1 |
| Avg | 0.0229 | 0.1523 | 30.6 |

[1] Fiber layers closest to perforated belt during formation of mat.

From the data of Table I it was determined that the average values for the several cuttings is 0.2933 g./cu. in. for the first 1/4" (belt side) and 0.0896 g./cu. in. for the last 1/4". These density values, as well as those given in Table I, are average for the density is not uniform in each 1/4" portion, but increases from the low to the high density side of the mat.

When such 7/8" diameter cuttings from the 1" mat are compressed to 1/2" thickness in a filter chamber having a diameter of 3/4" and thereafter are divided into two halves along a plane parallel to the high density and low density surfaces, the half of higher density has an average density in the range between about 0.57 and 0.63 g./cu. in., and the lower density half as an average density in the range between about 0.27 and 0.41 g./cu. in. The ratio of average densities of the two halves (higher to lower) is from about 1.4:1 to about 2.3:1.

When similar 7/8" diameter cuttings of the above 1" mat are compressed to 3/8" in a housing having a diameter of 3/4", and thereafter are cut in a place parallel to the high and low density surfaces, one of the halves has a density in the range between about 0.75 and about 0.84, and the other has a density in the range between about 0.36 and about 0.55. The ratio of these densities is from about 1.35 to about 2.3.

Thus, the low density half of the filter element should have a density of from about 0.25 to about 0.55 g./cu. in. and the high density half should have a density of from about 0.55 to about 0.84 g./cu. in.

Referring now to Figs. 1 and 2, 1 indicates a generally cylindrical filter chamber member, provided with an interior bore which constitutes the filter chamber. Member 1 is provided with a seat or shoulder 2 and with a lug 3, which is provided with the passage 4 communicating with the filter chamber. Lug 3 is further provided with pipe threads as indicated at 5. The interior bore of member 1 is threaded at 6 to engage screw plug 7, which is adapted to be screwed into the bore and to seat in a gas tight manner against member 1, as indicated at 8. The screw plug is provided with a passage 9, which is furnished with pipe threads as shown at 10, and which communicates with the filter chamber. 11 and 12 are spiders provided with rims 13 and arms 14, adapted to furnish support for screens 15 and 16. 17 is a filter element in the form of a resilient mat comprising extremely fine glass fibers bonded by a bonding agent having the average density and density gradient stated above. For convenience in assembly and connection, member 1 may be provided with wrench grips, such as 18, and the head of the screw plug 7 may be formed as a nut.

All metal parts are preferably of a material or materials which do not corrode in the presence of manufactured or natural gas. As an example, the filter chamber member 1, the screw plug 7, and spiders 11 and 12 may be of brass which preferably has a copper content not greater than 68%, and screens 15 and 16 may be of stainless steel. Sixteen mesh screen is very satisfactory, although other suitable mesh screen may be employed.

The interior bore is preferably accurately dimensioned in diameter and length, as is also the screw plug. The screws and spider are preferably accurately formed in thickness. Such accurate dimensioning facilitates the securing of the desired arrangement of the resilient filter element in assembling the filter, and provides the compressed resilient mat with the desired cross-sectional area, depth and density.

In so assembling the filter, the spider 11 is positioned against the seat 2 and the screen 15 is placed abutting the spider. A resilient mat of bonded fine glass fibers of predetermined size and thickness is then placed in the filter chamber and the screen 16 and spider 12 positioned on the other side of it. Screw plug 7 is then introduced and tightened until it seats in gas tight contact with the end of member 1 as of 8, compressing the resilient mat of bonded glass fibers within the chamber.

The filter element may be stamped, punched, or otherwise formed from a web or blanket of the required thickness to give the desired density for the filter element, or a plurality of such webs may be superimposed to give the desired density upon compression. Generally, it is convenient to have the diameter of the filter element slightly larger than the diameter of the inner bore of the filter chamber member 1 to insure a tight fit and thus avoid the possibility of channeling about the wall of said inner bore. As an example, the filter element may have a diameter about 1/16 inch larger than the bore of the filter chamber member.

Accurate dimensioning of the parts predetermines the cross-section, density and depth of the bonded glass fiber filter element after compression. The quantity of the resilient filter should be such as will give the density appropriate to the determined depth after compression to the predetermined volume.

The connection to the gas supply line must be made at the low density end of the filter, the high density end being connected to the pilot or gas consuming device. Thus, filter element 17 is so disposed that gas flow is in the direction of increasing density of the filter element.

In use, the gas flows through the filter pad entering the low density surface and depositing therein vapor phase gum and inorganic particles, the screens and spiders serving merely to retain the relative position of the filter element without unduly impeding the flow of the gas.

The spiders with their arms 14 serve to support the screens and prevent their bulging while transmitting the pressure for compressing the filter element and further serve to provide gas spaces which distribute the gas across the area of the filter element.

As an example, a filter similar to that shown in Figs. 1 and 2, having a chamber bore of 0.75 inch diameter, is provided with a screw plug, screens and spiders dimensioned to provide a space for a bonded glass fiber filter element 0.375 inch in depth after compression. The filter element comprises 0.083 gram of a resilient mat composed of glass fibers having a diameter of from 0.3 to about 3 microns, which fibers are bonded together with about 29%, by weight on the basis of glass fibers in the mat, of a thermosetting phenol formaldehyde resin. The glass fibers have a length distribution within the range between about 0.1 and 1.0 in. or somewhat greater. The average density of the filter element when seated in the filter is about 0.5 gram per cubic inch, and the first portion through which the gas enters the filter element and which extends one-eighth the thickness of the filter in the direction of gas flow has an average density of 0.268 gram per cubic inch, and the last portion through which the gas passes in leaving the filter element and which extends one-eighth the thickness of the filter has an average density of one gram per cubic inch.

The filter efficiency of this gas filtering apparatus is determined by a standard test referred to as the American Standard Listing Requirements for Gum Protective Devices, effective January 1, 1946, approved, American Standard Association, sponsor, American Gas Association. In accordance therewith, a "heavily gummed gas" comprising 1.2%, by volume, of butadiene, 0.8% of oxygen, 80–120 grams of nitric oxide per million cubic feet of the gas mixture, and the balance comprising components inert to gum formation, after being aged for two hours in a reaction chamber, is passed through the gas filter. Such a gas contains in suspension an enormous number of reaction products having a particle size on the order of about 1 micron in diameter and less, quantitative measurements showing that the combined weight of these suspended particles is on the order of 400 grams per million cubic feet of the gas mixture. The gas flow at one inch water column pressure drop across the filter is 4.88 cubic feet per hour and the flow per square inch cross-section area approximately 11 cubic feet per hour. Filtration efficiency is measured by means of a light scattering electronic photometer which shows that greater than 99% of the suspended particles are removed from the gas stream by the filter.

Referring to Figs. 3 and 4, these figures illustrate a larger filter differing in some details from that in Figs. 1 and 2.

20 indicates a filter chamber having an interior bore providing the filter chamber. Member 20 is provided with a lug 21 having the passage 22 communicating with the filter chamber. Lug 21 is provided with pipe threads 23.

The member 20 is provided with threaded recesses 24 adapted to engage screws 25 which secure cover 26 to member 20. Cover 26 is provided with a passage 27, which communicates with the interior of the chamber and which is provided with pipe threads as at 28. 29 and 30 are screens similar to those of Figs. 1 and 2.

Instead of discrete spiders for supporting the screens and for providing gas distributing spaces, spiders are shown formed in the base of member 20, as indicated at 31, and on the inside of cover 26, as indicated at 32, the latter being shown more clearly in Fig. 4. 34 is a gasket to provide gas tight contact between the cover 26 and the chamber member 20. 35 is a filter member comprising a resilient mat of fine glass fibers bonded by a bonding agent having an average density and density gradient specified previously.

As in Figs. 1 and 2, the parts are preferably accurately dimensioned to provide a space for compressed bonded glass fibers of accurately predetermined area and depth to facilitate the securing of the proper density and depth in the compressed filter member.

The assembly of the apparatus in Figs. 3 and 4 is generally similar to that described with Figs. 1 and 2, except for the change due to the fact that the spiders are integral with the filter chamber member and cover, a gasket is employed, and the cover and chamber body are assembled together by means of a plurality of screws 25. As in Figs. 1 and 2, a convenient method of assembly includes the compression of a resilient mat of predetermined thickness, cross-section and weight comprising bonded glass fibers to an accurately predetermined cross-sectional area and depth and thus predetermined density.

As an example of a filter similar to that shown in Figs. 3 and 4, a filter having a chamber bore of 2.0625 inches in diameter, and having its spiders and screens dimensioned to give a space for a compressed mat of fine glass fibers bonded by a bonding agent, 0.50 inch deep, is provided with a mat comprising glass fibers having a diameter from about 0.5 to about 3 microns, and a length of 0.1 to 1.0 in., bonded together with about 29%, by weight based on glass fibers in the mat, of a phenol formaldehyde resin. The average density of the filter mat when compressed within the bore of the gas filter is approximately 0.5 gram per cubic inch. The first 1/16" thick portion of the filter element through which the gas passes has an average density of 0.37 gram per cubic inch, and the last 1/16" thick portion of the filter element through which the gas passes just prior to leaving the filter element has an average density of 1.34 grams per cubic inch.

A heavily gummed test gas of the type described above is passed through the filter, and the rate of flow of the gas at one inch water column pressure drop across filter is 31.16 cubic feet per hour, and the flow rate per square inch cross-sectional area of the filter is approximately 9.3 cubic feet per hour. The filter successfully passed the continued operation test as described by the American Standard Listing Requirements for Gum Protective Devices, and was found to remove 99% or better of the suspended vapor phase gum and inorganic particles in the test gas as determined by a light-scattering electronic photometer.

Employing the same gas filter housing and test gas, the example is repeated with 1.167 grams of a similar mat of glass fibers containing about 29% phenol formaldehyde resin. The average density of the filter element after compression in the housing is 0.7 gram per cubic inch. The first 1/16" thick portion of the filter element through which the gas passes has an average density of 0.45 gram per cubic inch, and the last 1/16" portion of the filter element through which the gas passes just prior to leaving the filter element has an average density of 1.10 per cubic inch. The gas flow at one inch pressure drop across the filter is 21.34 cubic feet per hour and the flow per square inch cross-sectional area is about 6.4 cubic feet per hour. The filter removes in excess of 99% of the minute vapor phase and inorganic particles.

After extended use the pressure drop across the filter will increase to some degree due to the collection of gum in the interstices of the filter element, which may eventually necessitate renewal. The life of the element, of course, depends somewhat on the quantity of the gum in the gas it is required to filter. As stated above, characteristics of the filter element made in accordance with this invention, however, permit considerable penetration in depth by the gum particles, so that filtration is not confined to a narrow zone on the entrance side of the element. In addition, depositing of gum particles is greatest where the porosity is greatest, which prevents clogging. These factors are influential in securing a low pressure drop and high rates of gas flow, along with a long filter element life. For example, according to American Gas Association standards, the flow rate should not drop more than 40% in the 31 day accelerated A.G.A. test. Gas filters according to this invention have been found to have a reduction in gas flow of only 15% or less in this A.G.A. test. The filter will in most cases outlive the appliance to which it is attached. This is of great importance commercially since the filter after having been installed, will, in the larger number of cases, require no servicing whatsoever.

The apparatus of the invention has been described particularly in connection with the filtering of vapor phase gum particles and inorganic particles from a combustible gas. It may however have use in other applications. For instance, it is an excellent filter for dust laden combustible gas. The figures show forms of the invention chosen for illustration.

It is to be understood that the foregoing is by way of illustration and changes, omissions, additions, substitutions, and/or modifications may be made within the scope of the claims without departing from the spirit of this invention.

It is claimed:

1. A unidirectional gas filter adapted to remove from a gas extremely minute vapor phase gum particles and inorganic particles, comprising a filter casing having inlet and outlet openings and a porous filter element comprising glass fibers having a diameter of from about 0.5 to about 3 microns bonded together by a bonding agent to form a resilient mat and arranged in said casing for the flow of said gas therethrough, said filter element increasing in density with distance from the gas inlet surface thereof, the average density of that portion of the filter element extending from the gas inlet surface thereof approximately one-eighth of the distance toward the gas outlet surface thereof being from about 0.2 to about 0.55 gram per cubic inch, and the average density of that portion of the filter element extending from the gas outlet surface thereof approximately one-eighth of the distance toward the gas inlet surface thereof being from about 1 to about 1.8 grams per cubic inch, said filter element having an average density of from about 0.4 to about 0.7 per cubic inch.

2. A gas filter according to claim 1 in which said filter element has a depth in the direction of gas flow of from about 3/8" to about 1/2".

3. A gas filter according to claim 2 in which said resilient mat is comprised of from about 25% to about 35%, by weight, of bonding agent, based on glass fibers.

4. A gas filter according to claim 2 in which said bonding agent comprises a thermosetting phenol formaldehyde resin.

5. A gas filter according to claim 2 in which said glass fibers have a length distribution in the range between about 0.1 and 1 inch.

6. A unidirectional gas filter adapted to remove from a gas extremely minute vapor phase gum particles and inorganic particles, comprising a filter casing having inlet and outlet openings and a porous filter element comprising glass fibers having a diameter of from about 0.5 to about 3 microns bonded together by a bonding agent to form a resilient mat and arranged in said casing for the flow of said gas therethrough, said filter element increasing in density with distance from the gas inlet surface thereof, the average density of that portion of the filter element extending from the gas inlet surface thereof approximately one-half the distance toward the gas outlet surface thereof being from about 0.25 to about 0.55 gram per cubic inch, and the average density of that portion of the filter element extending from the gas outlet surface thereof approximately one-half the distance toward the gas inlet surface thereof being from about 0.55 to about 0.84 gram per cubic inch, the average density of that portion of the filter element extending from the gas inlet surface thereof approximately one-eighth of the distance toward the gas outlet surface thereof being from about 0.2 to about 0.55 gram per cubic inch, and the average density of that portion of the filter element extending from the gas outlet surface thereof approximately one-eighth of the distance toward the gas inlet surface thereof being from about 1 to about 1.8 grams per cubic inch, said filter element having an average density of from about 0.4 to about 0.7 per cubic inch.

7. A gas filter according to claim 6 in which said resilient mat is composed of from about 25% to about 35%, by weight, of bonding agent, based on glass fibers.

8. A gas filter according to claim 6 in which said bonding agent comprises a thermosetting phenol formaldehyde resin.

9. A gas filter according to claim 6 in which said glass fibers have a length distribution in the range between about 0.1 and 1 inch.

10. A gas filter according to claim 6 in which said filter element has a depth in the direction of gas flow of from about 3/8" to about 1/2".

(References on following page)

References Cited in the file of this patent

UNITED STATES PATENTS

| | | |
|---|---|---|
| 2,251,964 | Stackhouse | Aug. 12, 1941 |
| 2,579,984 | Trowbridge | Dec. 25, 1951 |
| 2,629,459 | Hammond et al. | Feb. 24, 1953 |
| 2,692,654 | Pryor | Oct. 26, 1954 |
| 2,774,443 | Slayter | Dec. 18, 1956 |
| 2,784,132 | Maisel | Mar. 5, 1957 |
| 2,798,850 | Voightman et al. | July 9, 1957 |
| 2,821,261 | Vixler | Jan. 28, 1958 |
| 2,835,341 | Parker | May 20, 1958 |
| 2,843,341 | Dannenberg et al. | July 15, 1958 |
| 2,888,095 | Perrini et al. | May 26, 1959 |